United States Patent
Henriques et al.

(10) Patent No.: US 11,367,255 B2
(45) Date of Patent: Jun. 21, 2022

(54) DETERMINATION OF MODELING ACCURACY BETWEEN THREE-DIMENSIONAL OBJECT REPRESENTATIONS

(71) Applicants: HEWLETT-PACKARD DEVELOPMENT COMPANY, L.P., Spring, TX (US); UNIVERSIDADE FEDERAL DE PERNAMBUCO—UFPE, Recife (BR)

(72) Inventors: Diogo Henriques, Recife (BR); Francisco Simoes, Recife (BR); Silvio Melo, Recife (BR); André Silva, Recife (BR); Thiago Chaves, Recife (BR); Gustavo Charamba, Recife (BR); Joao Teixeira, Recife (BR); Veronica Teichrieb, Recife (BR); Gutemberg Barros, Recife (BR); Walter Correia, Recife (BR); Thiago Domingues, Recife (BR); Vinicius Castilho, Recife (BR); Scott A. White, Boise, ID (US); Marcelo Riss, Porto Alegre (BR)

(73) Assignees: Hewlett-Packard Development Company, L.P., Spring, TX (US); Universidade Federal de Pernambuco—UFPE, Recife (BR)

( * ) Notice: Subject to any disclaimer, the term of this patent is extended or adjusted under 35 U.S.C. 154(b) by 66 days.

(21) Appl. No.: 17/052,498

(22) PCT Filed: Oct. 30, 2018

(86) PCT No.: PCT/US2018/058292
§ 371 (c)(1),
(2) Date: Nov. 2, 2020

(87) PCT Pub. No.: WO2020/091745
PCT Pub. Date: May 7, 2020

(65) Prior Publication Data
US 2021/0241530 A1 Aug. 5, 2021

(51) Int. Cl.
*G06T 19/00* (2011.01)
*G06T 7/00* (2017.01)
(Continued)

(52) U.S. Cl.
CPC ............ *G06T 19/00* (2013.01); *B29C 64/386* (2017.08); *B33Y 50/00* (2014.12); *G06T 7/0002* (2013.01);
(Continued)

(58) Field of Classification Search
None
See application file for complete search history.

(56) References Cited

U.S. PATENT DOCUMENTS 7,643,030 B2   1/2010   Papakipos et al.
9,600,929 B1*  3/2017   Young ....................... G06T 1/60
(Continued)

OTHER PUBLICATIONS

Decker et al., "A Simplified Benchmarking Model For The Assessment. Of Dimensional Accuracy In FDM Processes," 2015, Int. J. Rapid Manufacturing, vol. 5, No. 2, pp. 145-154.

*Primary Examiner* — Saptarshi Mazumder
(74) *Attorney, Agent, or Firm* — Conley Rose PC

(57) ABSTRACT

An example of a computer-readable medium is provided to store machine-readable instructions. The instructions may cause a processor to receive three-dimensional (3D) object representations of an object. The distance between points of a grid applied to 3D object representation and random points on the 3D object representation may provide a sampling error used in calculating a modeling accuracy between the 3D object representations.

15 Claims, 4 Drawing Sheets

(51) Int. Cl.
*B33Y 50/00* (2015.01)
*B29C 64/386* (2017.01)
*G06T 17/20* (2006.01)
*G06T 17/30* (2006.01)

(52) U.S. Cl.
CPC .............. *G06T 17/20* (2013.01); *G06T 17/30* (2013.01); *G06T 2207/30168* (2013.01)

(56) References Cited

U.S. PATENT DOCUMENTS

| | | | |
|---|---|---|---|
| 9,662,840 | B1 | 5/2017 | Buller et al. |
| 9,902,114 | B2 * | 2/2018 | Musuvathy ............. G06F 30/17 |
| 9,978,177 | B2 | 5/2018 | Mehr et al. |
| 2002/0190986 | A1 | 12/2002 | Fujiwara et al. |
| 2007/0236514 | A1 * | 10/2007 | Agusanto ........... G02B 27/0093 |
| | | | 345/646 |
| 2009/0244065 | A1 * | 10/2009 | Storti ................... G06V 10/267 |
| | | | 382/131 |
| 2012/0013617 | A1 | 1/2012 | Zhang et al. |
| 2013/0127847 | A1 | 5/2013 | Jin et al. |
| 2013/0169638 | A1 | 7/2013 | Carbonera et al. |
| 2016/0102975 | A1 | 4/2016 | McCloskey et al. |
| 2016/0203637 | A1 | 7/2016 | Luo et al. |
| 2017/0177745 | A1 | 6/2017 | Sheng et al. |
| 2019/0096135 | A1 * | 3/2019 | Dal Mutto ........... G06K 9/6257 |

* cited by examiner

DETERMINATION OF MODELING ACCURACY BETWEEN THREE-DIMENSIONAL OBJECT REPRESENTATIONS

BACKGROUND

Representations of three-dimensional (3D) objects may be created in an application on a computer system. Between creating a 3D object representation and manipulating it or preparing it for printing by a 3D printer, multiple 3D object representation formats may be used, with a computer system converting the representation between different representation formats.

BRIEF DESCRIPTION OF THE DRAWINGS

Various examples will be described below referring to the following figures.

DETAILED DESCRIPTION

Converting 3D object representations between various formats may introduce differences between the 3D object representations. Some 3D object representation formats may better represent curved surfaces. Other formats may be easier to process into planar slices for use in a 3D printing process. In creating or updating applications, different formats or conversions between the formats may be used. Calculating the differences between corresponding sections of different 3D object representations of the same object may be used in evaluating the different formats or changes in applications that manipulate the formats.

Different 3D object representations of the same object may be sampled and differences between corresponding portions of the 3D object representations calculated. A 3D object representation may also be compared against itself at short, randomly spaced points to determine a sampling error due to localized differences of the object.

Figure 1:
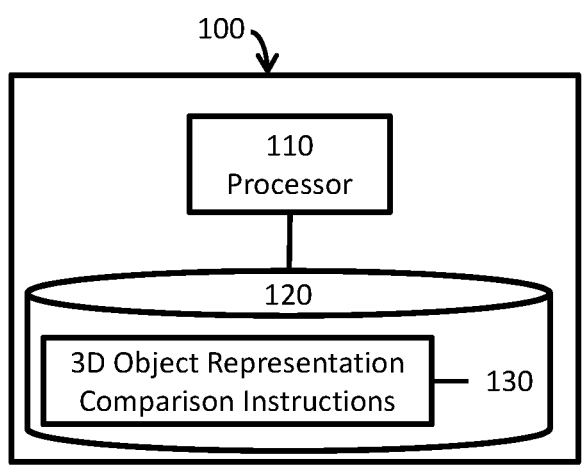
FIG. 1 shows a computer system for execution of machine-readable 3D object representation comparison instructions in accordance with various examples.

FIG. 1 shows a computer system 100 for execution of machine-readable 3D object representation comparison instructions 130 in accordance with various examples. The computer system may comprise a processor 110 and a computer-readable medium 120. The computer-readable medium 120 may store 3D object representation comparison instructions 130 for execution by the processor 110.

In various examples, the processor 110 may comprise a microprocessor, a microcomputer, a controller, a field programmable gate array (FPGA), or discrete logic to execute machine-readable 3D object representation comparison instructions 130. The processor 110 may be part of a computer system 100, such as a laptop or desktop computer, a server, a cell phone, or a tablet. The processor 110 may execute the 3D object representation comparison instructions 130 stored in the computer-readable medium 120. The processor 110 may execute machine-readable 3D object representation comparison instructions that implement the methods discussed in connection with other figures herein. The computer-readable medium 120 may store 3D object representations in different formats. The computer-readable medium 120 may include a hard drive, solid state drive (SSD), flash memory, electrically erasable programmable read-only memory (EEPROM), or random-access memory (RAM).

An object may be modeled in a computer-assisted design (CAD) application. The CAD application may create a non-uniform rational basis spline (NURBS) representation of the object. A NURBS representation format may offer flexibility and precision in modeling the object. The NURBS representation may capture the surface area of the object being represented. A planar mesh format may be used to represent the same object. The planar mesh format may comprise multiple planar polygons connected along sides. For example, different sizes and shapes of triangles may be used to represent the surface area of the object. The NURBS representation may be able to better capture curves of the object, while the planar mesh may approximate curves by using small planar polygons. The planar mesh may be more easily manipulated for other purposes, such as determining an intersection with a plane.

A Steiner Patch, also known as a rational quadratic Bézier triangle, may be used to model the object to allow for more closely matching curves than planar triangles, while using less memory. A planar triangle may be represented by three points in Euclidean space, one per corner of the planar triangle. A point may include three numbers for coordinates, an x, y, and z. These coordinates may be represented by floating point numbers, or nine floating point numbers per planar triangle. A Steiner Patch may be represented by 21 floating point numbers, such as three corner points in Euclidean space, three intermediary control points in Euclidean space, and one weight per intermediary control point. As the Steiner Patch allows modeling of a 3D curve, modeling an object using a mesh of Steiner Patches may use less storage than modeling an object using a mesh of planar triangles, while doing so with a higher accuracy.

In 3D printing a 3D model, the model may be "sliced" by calculating a layer as an intersection of the 3D model with a two-dimensional plane in Euclidean space. An object may be 3D printed by printing such layers, stacked one of top of another. Steiner Patches and planar triangular meshes may be sliced for 3D printing. Slicing a NURBS representation may be more difficult than slicing a Steiner Patch or planar triangular mesh. Thus, the NURBS representation may be converted to a Steiner Patch or planar mesh format before being 3D printed. The Steiner Patch or planar mesh format may comprise multiple triangles. Calculating the intersection of the 3D object representation with a two-dimensional plane in Euclidean space may include calculating the intersection of the plane with multiple Steiner Patches or multiple triangles of a planar triangular mesh.

In converting between object representations, accuracy of the modeled object may be lost. The amount of accuracy may depend on how much memory the new object representation is allowed to consume. By using smaller triangles and thus more triangles and more memory, the new object representation may be more accurate when compared to the input object representation, whether planar triangles or Steiner Patches are used. For some objects, Steiner Patches may result in a more accurate model representation based on memory constraints. For other objects, a Steiner Patch may be as accurate as a planar triangular mesh, but consume more memory (e.g., a model with flat surfaces instead of curved, such as a cube). The ability to compare the accuracy of two object representations in two arbitrary representation formats may enable better analysis and selection of object representations and the tools used in modeling and converting between models.

In various examples, an application may have the option of converting a NURBS object representation into a Steiner Patch object representation or a planar mesh object representation for use in 3D printing. The application may convert the NURBS object into a Steiner Patch representation and determine the accuracy of the conversion. The application may convert the NURBS object into a planar mesh representation and determine the accuracy of the conversion. The application may use the accuracy and memory used by the different representations to select one of the representations for use.

In various examples, the application may use the accuracy and memory usage to determine that more memory will be allowed to enable a more accurate representation. Calculating the accuracy of the representation may be performed on sections of the representations. Sections of the representation may be broken into smaller Steiner Patches or planar mesh units. The representations may include Steiner Patches or planar polygons of various sizes, such as by increasing the number of Steiner Patches or planar polygons in sections where the object has a more complicated curvature.

In various examples, an application may be updated to convert object representations using different methods. Various tuning parameters may be involved to determine a blend of accuracy, memory use, ease of use, or other issues. Being able to compare the accuracy of the output representations to the input representation may enable better selection of conversion methods or assist in identification of errors in implementing the methods.

Comparing the accuracy may involve receiving a 3D object representation of an object. The 3D object representation may be of various formats. For example, the 3D object representation may be a NURBS format that is to be converted to a Steiner Patch format. The 3D object representation could be a Steiner Patch format to be converted to a planar mesh format.

Figure 2:
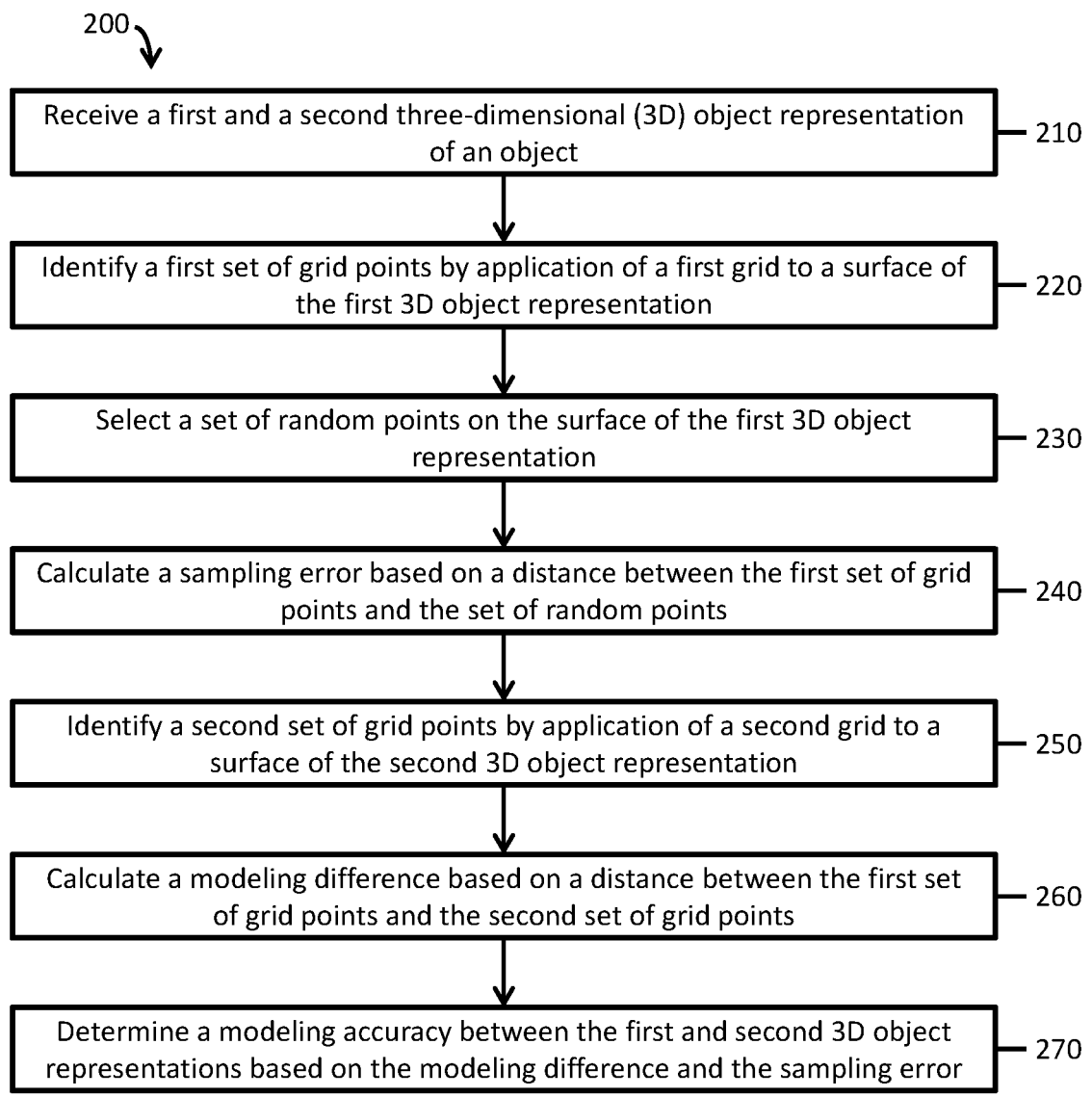
FIG. 2 shows a method of determining modeling accuracy between 3D object representations in accordance with various examples.

FIG. 2 shows a method 200 of determining modeling accuracy between 3D object representations in accordance with various examples. The method 200 includes receiving a first and a second three-dimensional (3D) object representation of an object (210). The method 200 includes identifying a first set of grid points by application of a first grid to a surface of the first 3D object representation (220). The method 200 includes selecting a set of random points on the surface of the first 3D object representation (230). The method 200 includes calculating a sampling error based on a distance between the first set of grid points and the set of random points (240). The method 200 includes identifying a second set of grid points by application of a second grid to a surface of the second 3D object representation (250). The method 200 includes calculating a modeling difference based on a distance between the first set of grid points and the second set of grid points (260). The method 200 includes determining a modeling accuracy between the first and second 3D object representations based on the modeling difference and the sampling error (270).

In various examples, two 3D object representations may be received. One of the 3D object representations may be an originating 3D model, such as a NURBS model created using a CAD tool. Another of the 3D object representations may be created based on the NURBS model, such as by a conversion into a planar mesh format or a Steiner Patch format. The two object representations may be compared to determine how accurate the converted representations are to the original. A third 3D object representation may also be received. Two of the 3D object representations may have been converted from the third, such as converting a NURBS model into a planar mesh format and a Steiner Patch format. The accuracy of the two converted representations may be compared against the original. The accuracy information may be used in deciding which representation to keep. For example, a Steiner Patch representation may consume 50% less memory than a planar mesh representation, but have a slightly lower accuracy. The Steiner Patch representation may be saved due to its lower memory usage and comparable accuracy, or the planar mesh representation may be saved where higher accuracy is desired. Alternatively, a new Steiner Patch representation may be requested that has higher accuracy than the planar mesh format, with an expectation that memory usage would still be less than the planar mesh format.

In various examples, one 3D object representation may be selected to determine a sampling error. Where an original 3D object representation has been converted to a converted 3D object representation, the original 3D object representation may be selected for determining the sampling error. The sampling error may provide an approximation of how much minor differences in converting the 3D object representation may affect the accuracy of the converted model.

A grid may be applied to the surface of a 3D object representation. A set of grid points may be ascertained by the location of the intersecting lines of the grid. The application of the grid may occur in parametric space and may allow the use of a uniform grid in parametric space. The grid may include a square grid, triangular grid, or other grid format. A triangular grid may include a grid of equilateral triangles. A triangular grid may be created from a square or rectangular grid by connecting the opposite corners of the square or rectangle.

A set of random points may be selected on the surface of the 3D object representation. The term random is intended to include both true random and pseudo-random. A sampling error may be calculated based on the set of grid points and the random points. The set of grid points and the set of random points create point clouds, whose distance may be compared, such calculating the distance from grid points to the closest random points. Multiple grid points may use the same random point as their closest random point, while other random points may not be used. A different number of random points may be used than the number of grid points. A distances between these sets of points may be calculated, such as by calculating a mean distance between the grid points and the closest corresponding random points across the modeled 3D surface. The distance may be calculated as an arithmetic mean, geometric mean, root mean square, or comparable calculation. In various examples, an arithmetic mean may be used. To provide more statistical significance, the selection of random points and calculation of mean distances may be performed multiple times. A mean of these mean distances may then be calculated to reduce the chances of having picked an outlier distribution of random points. In calculating a sampling error using different sets of random points, the number of random points used may be different.

A grid may be applied to the surface of the second 3D object representation, where the set of grid points on one of the two objects roughly corresponds to the set of grid points on the other. Minor differences in location are to be expected between corresponding grid points on the separate 3D object representations due to minor differences in the represented surface area. These distances may be calculated as a modeling difference between the two 3D object representations and represented as a mean distance. The grid spacing used in comparing the two 3D object representations may be the same in parametric space. Due to distortions, the spacing on the object representations may differ in the Euclidean space.

The sampling error of a 3D object representation and the modeling difference between two 3D object representations may be considered in determining the modeling accuracy between the two 3D object representations. The sampling error may be used to verify the modeling accuracy between distinct representations of the same 3D model by compensating distortions occurring at the pairing between 3D points on distinct point clouds.

In various examples, one of the 3D object representations may be derived from the other. This may occur as part of a conversion process, such as converting a NURBS representation format into a Steiner Patch representation format. The selection of the size of grid and corresponding number of grid points used for calculating the sampling error and modeling difference may be based on a target precision of the conversion. Using more grid points may result in a more precise determination of any sampling error and modeling differences. For example, if a precision within a margin of 1 millimeter is desired, selecting a grid size of 5 millimeters will be insufficient.

Figure 3:
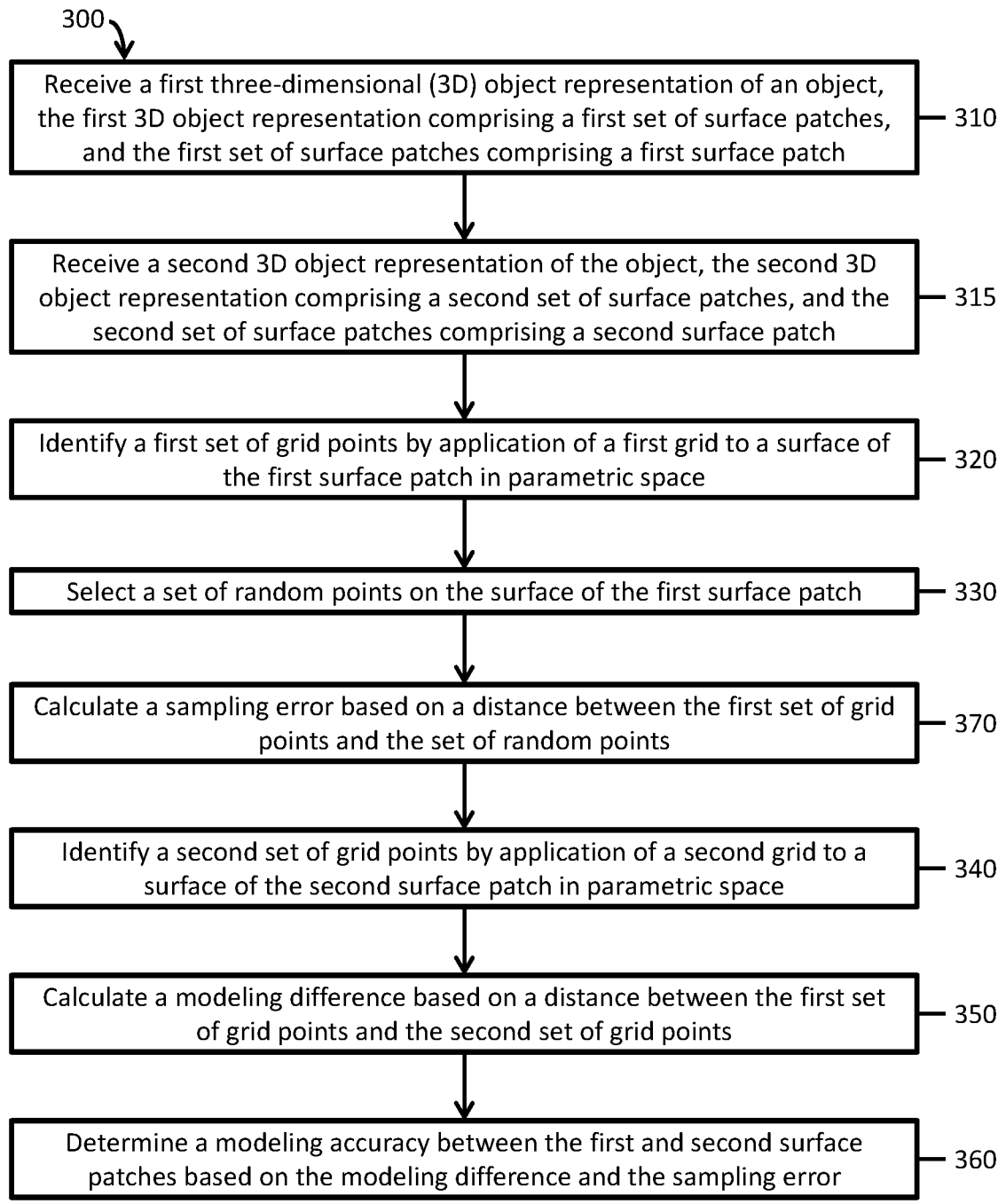
FIG. 3 shows a method of determining modeling accuracy between surface patches of 3D object representations in accordance with various examples.

FIG. 3 shows a method 300 of determining modeling accuracy between surface patches of 3D object representations in accordance with various examples. The method 300 includes receiving a first three-dimensional (3D) object representation of an object, the first 3D object representation comprising a first set of surface patches, and the first set of surface patches comprising a first surface patch (310). The method 300 includes receiving a second 3D object representation of the object, the second 3D object representation comprising a second set of surface patches, and the second set of surface patches comprising a second surface patch (315). The method 300 includes identifying a first set of grid points by application of a first grid to a surface of the first surface patch in parametric space (320). The method 300 includes selecting a set of random points on the surface of the first surface patch (330). The method 300 includes calculating a sampling error based on a distance between the first set of grid points and the set of random points (340). The method 300 includes identifying a second set of grid points by application of a second grid to a surface of the second surface patch in parametric space (350). The method 300 includes calculating a modeling difference based on a distance between the first set of grid points and the second set of grid points (360). The method 300 includes determining a modeling accuracy between the first and second surface patches based on the modeling difference and the sampling error (370).

Calculating the modeling accuracy may be performed on a piecemeal basis. For example, 3D object representations may include multiple corresponding surface patches. These surface patches may be compared rather than the entire 3D model. A surface patch is a section of a surface of a 3D object representation, such as a Steiner Patch or a planar triangle.

In various examples, comparison of the surface patches may be used in comparing different methods that may be applied to 3D object representations. For example, two different methods may be usable to convert a NURBS object representation into a Steiner Patch representation. A surface patch of the NURBS object may be selected for conversion into a Steiner Patch for a representative comparison of the two methods. The accuracy of the two Steiner Patches may be analyzed against the original NURBS object. Such a comparison may be used in evaluating alternative processes for 3D object manipulation or determining the acceptability of new formats for 3D object representation.

Figure 4:
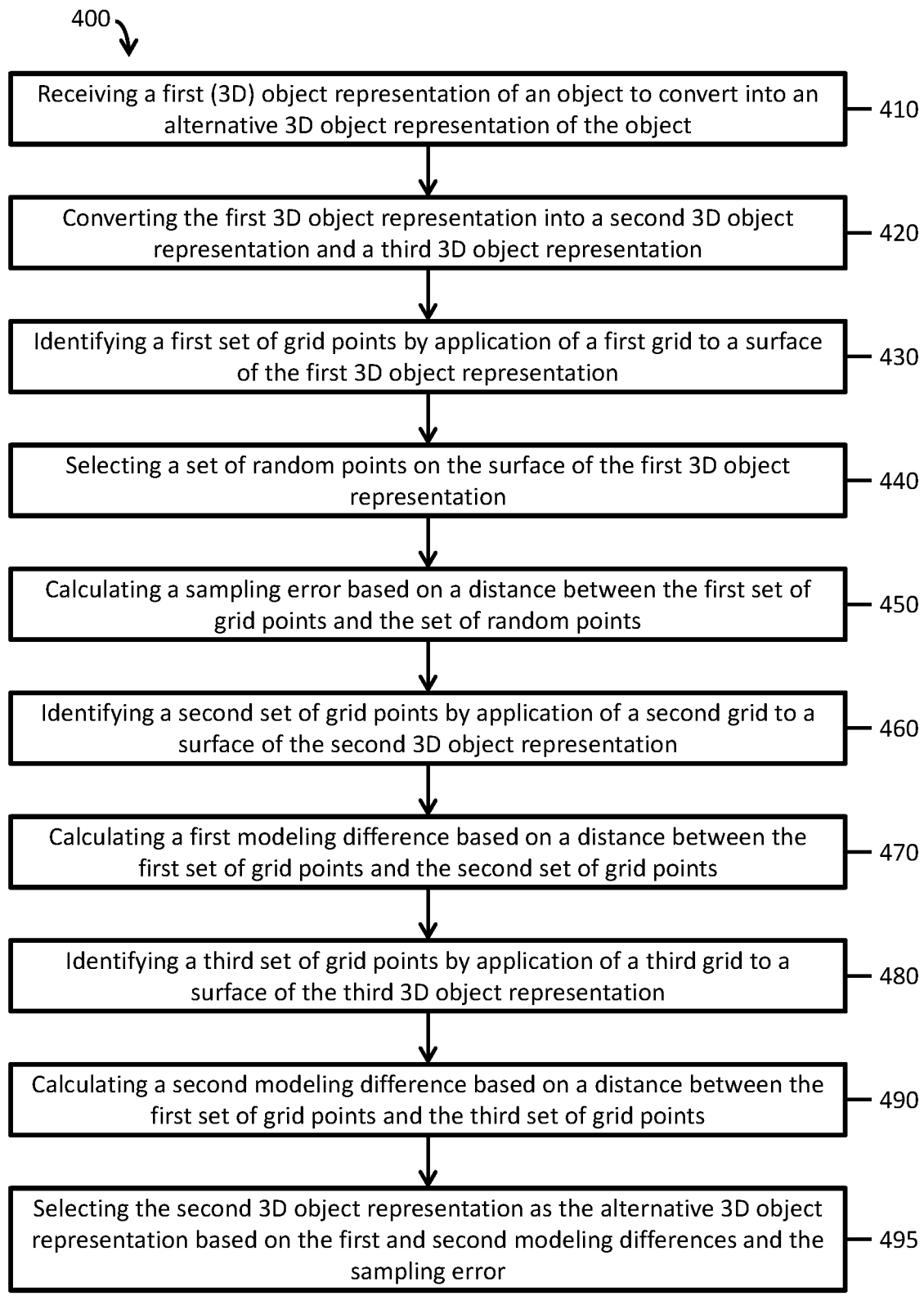
FIG. 4 shows method of converting 3D object representations into different formats and selecting a converted format in accordance with various examples.

FIG. 4 shows method of converting 3D object representations into different formats and selecting a converted format in accordance with various examples. The method 400 includes receiving a first (3D) object representation of an object to convert into an alternative 3D object representation of the object (410). The method 400 includes converting the first 3D object representation into a second 3D object representation and a third 3D object representation (420). The method 400 includes identifying a first set of grid points by application of a first grid to a surface of the first 3D object representation (430). The method 400 includes selecting a set of random points on the surface of the first 3D object representation (440). The method 400 includes calculating a sampling error based on a distance between the first set of grid points and the set of random points (450). The method 400 includes identifying a second set of grid points by application of a second grid to a surface of the second 3D object representation (460). The method 400 includes calculating a first modeling difference based on a distance between the first set of grid points and the second set of grid points (470). The method 400 includes identifying a third set of grid points by application of a third grid to a surface of the third 3D object representation (480). The method 400 includes calculating a second modeling difference based on a distance between the first set of grid points and the third set of grid points (490). The method 400 includes selecting the second 3D object representation as the alternative 3D object representation based on the first and second modeling differences and the sampling error (495).

In various examples, an application may be able to make use of multiple different 3D object representation formats. For example, a 3D printer may be able to convert a NURBS object representation into a Steiner Patch object representation or a planar mesh object representation for pre-printing processing. Different object representation formats may be better suited to different objects. For example, a planar mesh object representation format may provide better accuracy or lower memory footprint for objects with generally flat surfaces, while a Steiner Patch object representation format may be better suited to objects with lots of curved surfaces. In preparing to 3D print an object, an application may convert the NURBS object into both a Steiner Patch object representation and a planar mesh object representation and evaluate which one is best suited for the object. This evaluation may include comparison of the converted object representations against the original NURBS object representation. Other factors, such as memory usage and processor usage in manipulating the object representations and a desired accuracy of measurement may be considered.

In various examples, selection of one converted object representation may be in response to the object representation with the smaller modeling difference.

In various examples, the calculation of a modeling accuracy may cause the application to perform another conversion of the NURBS object into another format. The subsequent conversion may be performed with different parameters, such as allowing for a larger memory footprint or allowing more time for the conversion process.

The above discussion is meant to be illustrative of the principles and various examples of the present disclosure. Numerous variations and modifications will become appar-

What is claimed is:

1. A non-transitory computer-readable medium to store machine-readable instructions that, when executed by a processor, cause the processor to:
 receive a first and a second three-dimensional (3D) object representation of an object;
 identify a first set of grid points by application of a first grid to a surface of the first 3D object representation;
 select a set of random points on the surface of the first 3D object representation;
 calculate a sampling error based on a distance between the first set of grid points and the set of random points;
 identify a second set of grid points by application of a second grid to a surface of the second 3D object representation;
 calculate a modeling difference based on a distance between the first set of grid points and the second set of grid points; and
 determine a modeling accuracy between the first and second 3D object representations based on the modeling difference and the sampling error.

2. The computer-readable medium of claim 1, wherein the first grid includes a uniform grid in the parametric space of the first 3D object representation.

3. The computer-readable medium of claim 1, wherein the first 3D object representation comprises a non-uniform rational basis spline (NURBS) format, and wherein the second 3D object representation comprises a Steiner Patch format.

4. The computer-readable medium of claim 1, wherein a number of points in the first set of grid points is not equal to a number of points in the set of random points.

5. The computer-readable medium of claim 1, wherein a distribution of the first set of grid points is based on a target precision for the second 3D object representation.

6. A non-transitory computer-readable medium to store machine-readable instructions that, when executed by a processor, cause the processor to:
 receive a first three-dimensional (3D) object representation of an object, the first 3D object representation comprising a first set of surface patches, and the first set of surface patches comprising a first surface patch;
 receive a second 3D object representation of the object, the second 3D object representation comprising a second set of surface patches, and the second set of surface patches comprising a second surface patch;
 identify a first set of grid points by application of a first grid to a surface of the first surface patch in parametric space;
 select a set of random points on the surface of the first surface patch;
 calculate a sampling error based on a distance between the first set of grid points and the set of random points;
 identify a second set of grid points by application of a second grid to a surface of the second surface patch in parametric space;
 calculate a modeling difference based on a distance between the first set of grid points and the second set of grid points; and
 determine a modeling accuracy between the first and second surface patches based on the modeling difference and the sampling error.

7. The computer-readable medium of claim 6, wherein the machine-readable instructions, when executed by the processor, cause the processor to:
 select a second set of random points on the surface of the first surface patch;
 calculate a second sampling error based on a distance between the first set of grid points and the second set of random points; and
 calculate a mean sampling error based on a mean of the sampling error and the second sampling error, wherein the determination of a modeling accuracy is based on the mean sampling error.

8. The computer-readable medium of claim 7, wherein a number of points in the set of random points and a number of points in the second set of random points are different.

9. The computer-readable medium of claim 6, wherein the first set of grid points includes a first and a second grid point, wherein the set of random points includes a first and a second random point, wherein the first random point is the point in the set of random points closest to the first grid point, wherein the second random point is the point in the set of random points closest to the second grid point, and wherein calculation of a sampling error includes calculating a distance between the first grid point and the first random point in Euclidean space and a distance between the second grid point and the second random point in Euclidean space.

10. The computer-readable medium of claim 6, wherein the first 3D object representation comprises a non-uniform rational basis spline (NURBS) format, and wherein the second 3D object representation comprises a Steiner Patch format.

11. A method comprising:
 receiving a first (3D) object representation of an object to convert into an alternative 3D object representation of the object;
 converting the first 3D object representation into a second 3D object representation and a third 3D object representation;
 identifying a first set of grid points by application of a first grid to a surface of the first 3D object representation;
 selecting a set of random points on the surface of the first 3D object representation;
 calculating a sampling error based on a distance between the first set of grid points and the set of random points;
 identifying a second set of grid points by application of a second grid to a surface of the second 3D object representation;
 calculating a first modeling difference based on a distance between the first set of grid points and the second set of grid points;
 identifying a third set of grid points by application of a third grid to a surface of the third 3D object representation;
 calculating a second modeling difference based on a distance between the first set of grid points and the third set of grid points; and
 selecting the second 3D object representation as the alternative 3D object representation based on the first and second modeling differences and the sampling error.

12. The method of claim 11, wherein selecting the second 3D object representation as the alternative 3D object representation is in response to the first modeling difference being smaller than the second modeling difference.

13. The method of claim 11, comprising revising the second 3D object representation and the third 3D object representation based on the first and second modeling differences and the sampling error.

14. The method of claim 11, wherein the application of the first grid to the surface of the first 3D object representation is in parametric space, wherein the application of the second grid to the surface of the second 3D object representation is in parametric space, and wherein the application of a third grid to a surface of the third 3D object representation is in parametric space.

15. The method of claim 14, wherein first grid has a first grid spacing, wherein the second grid has a second grid spacing, wherein the third grid has a third grid spacing, and the first grid spacing, second grid spacing, and third grid spacing are the same in parametric space.

* * * * *